United States Patent [19]

Holzer

[11] Patent Number: 5,128,590
[45] Date of Patent: Jul. 7, 1992

[54] COMPACT FLUORESCENT LAMP

[76] Inventor: Walter Holzer, Drosteweg 19, 7758 Meersburg, Fed. Rep. of Germany

[21] Appl. No.: 670,901

[22] Filed: Mar. 18, 1991

[30] Foreign Application Priority Data

| Mar. 19, 1990 | [DE] | Fed. Rep. of Germany | 4008585 |
| Apr. 4, 1990 | [DE] | Fed. Rep. of Germany | 4010498 |
| Apr. 9, 1990 | [DE] | Fed. Rep. of Germany | 4011213 |
| Dec. 3, 1990 | [DE] | Fed. Rep. of Germany | 4037947 |

[51] Int. Cl.⁵ .............................................. H01J 7/44
[52] U.S. Cl. .................................... 315/58; 315/57; 315/63; 362/260; 313/493; 313/318
[58] Field of Search ............... 315/58, 56, 57, 50, 315/71, 61, 62, 53, 63; 362/260; 313/318, 493

[56] References Cited

U.S. PATENT DOCUMENTS 4,347,460  8/1982  Latassa et al. ............... 315/57 X
4,375,607  3/1983  Morton et al. ................. 315/56

*Primary Examiner*—Eugene R. LaRoche
*Assistant Examiner*—Ali Neyzari
*Attorney, Agent, or Firm*—Paul H. Gallagher

[57] ABSTRACT

A compact fluorescent lamp including one lamp with one or more tubular lamp members, and an electronic ballast constructed as a unit separate from the foregoing, which constituting an adapter, is electrically and mechanically connectable with the lamp by means of a plug-in connection. In order to achieve the smallest possible length of the compact fluorescent lamp, the plug-in connection between the lamp and the ballast, extends in the direction of the lamp at least partially into the space surrounded by the lamp.

7 Claims, 4 Drawing Sheets

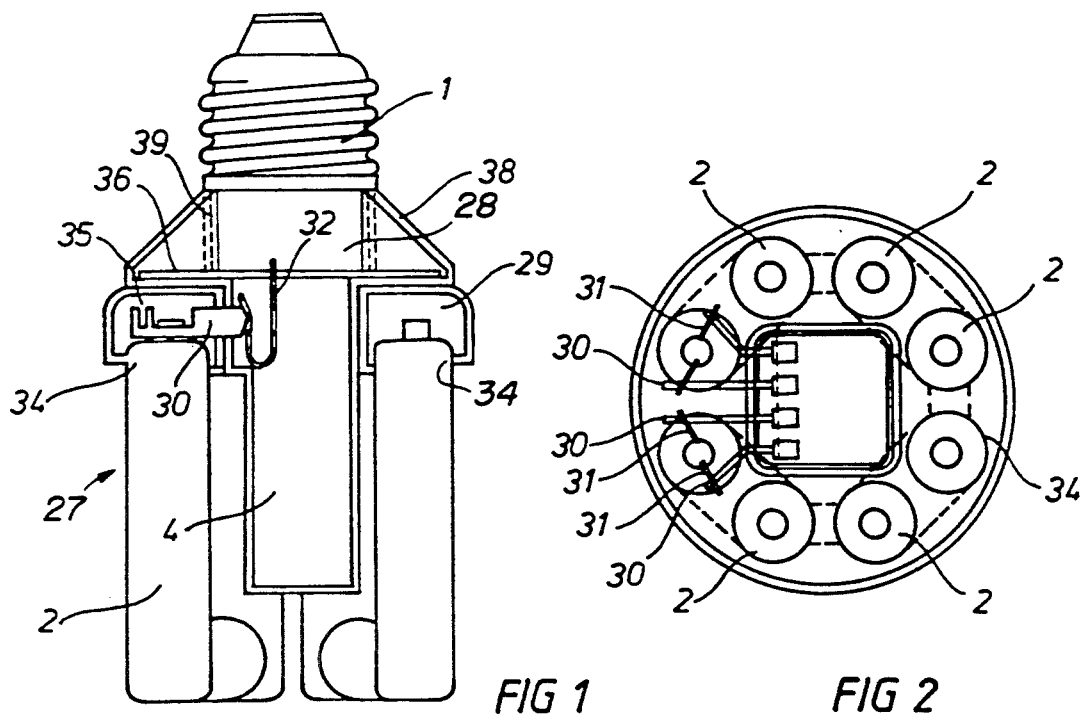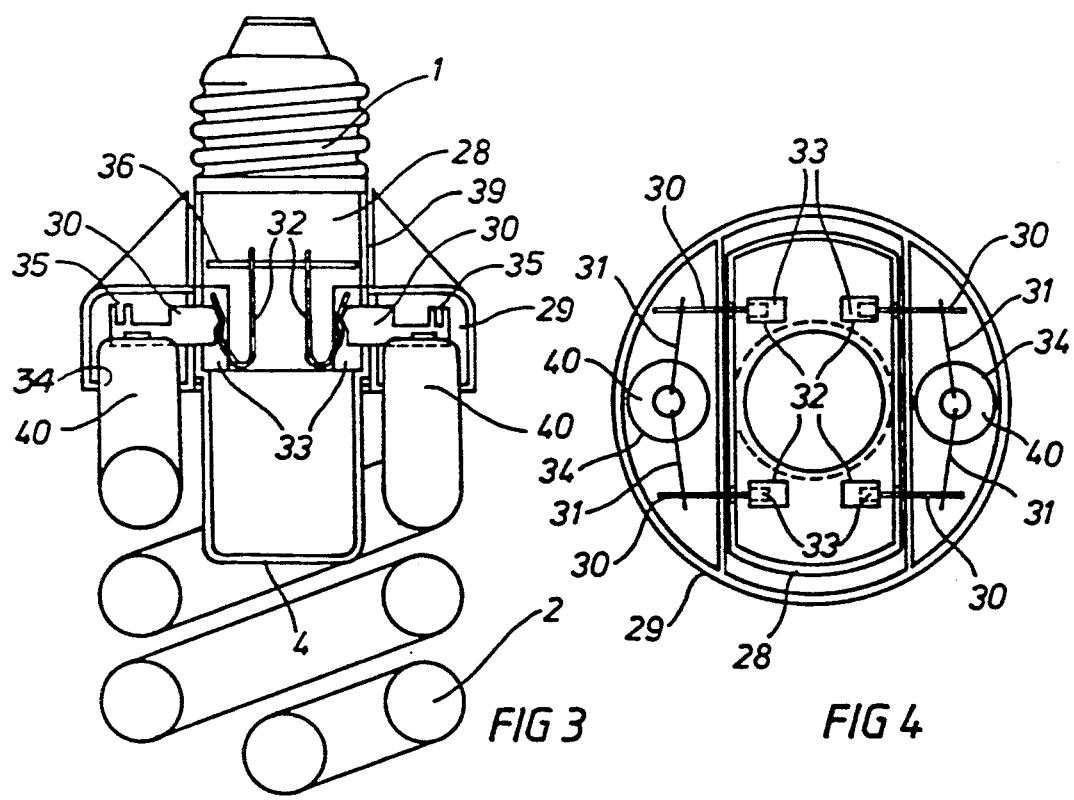

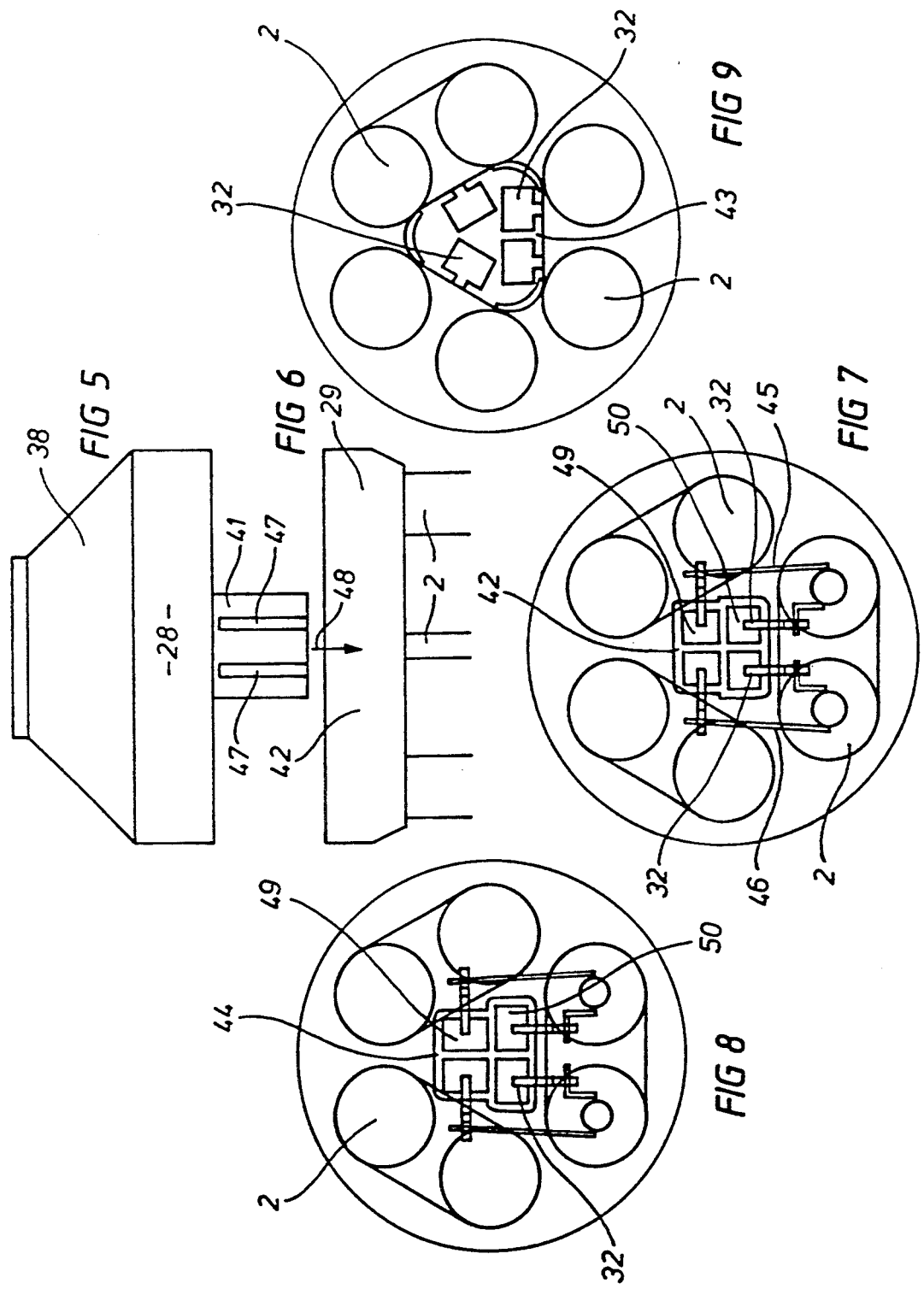

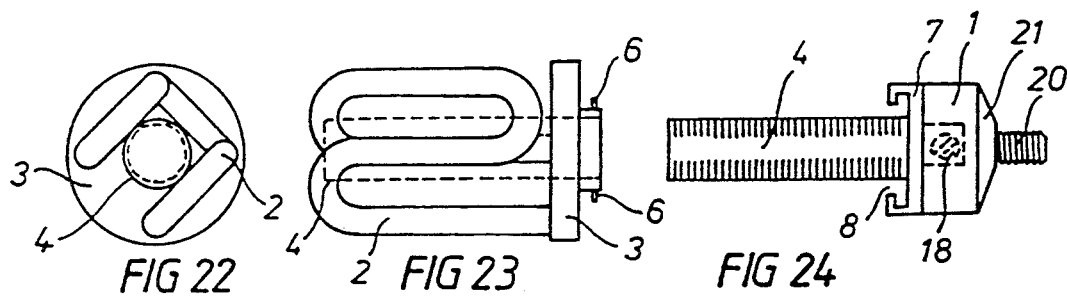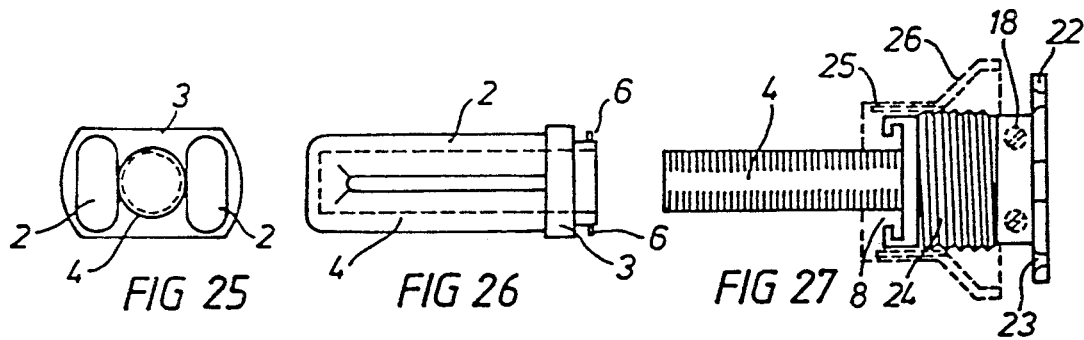

COMPACT FLUORESCENT LAMP

BRIEF SUMMARY OF THE INVENTION

The invention concerns a compact fluorescent lamp according to the generic concept of claim 1 herein. In the use of such compact fluorescent lamps, heretofore the usual manner of connecting the fluorescent lamp ballast in the light, was done by an adapter and utilizing a plug-in connection. Heretofore however an optimally short length of fluorescent lamp has not been achieved.

An object of the present invention is to provide solutions for the problem, to make the fluorescent lamps of space-saving size as well as to make them economically advantageous, and also to provide a construction in which the electronic fluorescent lamp ballast, and the lamp, are easily separable.

Compact fluorescent lamps normally include a lamp with one or more lamp members and an electronic ballast which is either directly integrated with the lamp as in one unit, or is arranged in an adapter that is electrically and mechanically connected with the lamp by means of a plug-in connection.

Difficulties are overcome by means of the technical concept of claim 1 herein, in optimal shortening of the length of the lamp members, whereby at least parts of the fluorescent lamp ballast, if not the total ballast, reaches into the interior of the lamp members, and wherein the construction incorporates a plug-in connection between the ballast and the lamps, and the ballast also extends at least partially into the interior space defined by the lamp members.

The lamp construction of the invention includes a plurality of tubular lamp members that are arranged around a central space, which is referred to as the "interior of the tubular lamp."

This central space is otherwise unused, but in the present case it is made usable. In the device of the present invention, considered from the end of the construction at which the connection between the members is provided, at least a portion of the plug-in connection and/or the fluorescent lamp ballast reach into that central or interior space, with the result that headroom is usable. Especially advantageous is that the part of the electronic fluorescent lamp ballast that is heat-sensitive, can be positioned in an axial direction in the central space of the tubular lamps, in such a way that it lies beyond the high-temperature region of the heated electrodes of the lamps.

To provide optimal shortening of the length of the lamp, rigid and elastic plug-in connections are provided and positioned between the fluorescent lamp ballast and the lamp, inside the central space in the lamp.

An advantage is achieved by the provision of a coupling ring which receives the tubular lamp members in holes, which are positioned on the larger radius of the coupling ring, and in the center of the coupling ring, in which the fluorescent lamp ballast is positioned, at least parts of the ballast are positioned.

In such a construction, the plug-in connections of the lamp, which are rigid, can be positioned generally at the height of the connection of the tubular lamp members, and which are positioned radially inwardly in the coupling ring, whereby to minimize the length of the connecting lines.

At the ballast, elastic plug-in connections are provided, positioned inn axial slits and thereby protected against disturbance.

Still another advantageous feature of the invention is that the arrangement of the rigid plug-in connections in the coupling ring, lends itself especially to an automatic assembly or mounting of the tubular lamp members in the ring and to the connection of the connecting leads of the lamp members, while the rigid plug-in connections are provided with clamping devices, such for example as slits in which the connecting leads are clamped.

The elastic plug-in connections of the ballast can, with proper shaping, also can be constructed as latchings, which secure the coupling ring with the tubular lamp members in proper position.

Also, the elastic plug-in connections lend themselves to a direct connection with a circuit board of the ballast, into which they are simply connected, by soldering. An especially space-saving design of ballast consists of building it as a flat component, approximately only as wide as, for example, the screw-in plug of an Edison socket E 27, whereby the central arrangement of parts of the ballast in the central space allows sufficient room to include all of the electrical components in such a flat housing.

The re-use of the ballast is thereby achieved, in that the tubular shaped housing, which contains the ballast, is designed as a separate component and is connectable with and removable from the connecting part. Thereby, in changing lamp members, the ballast can be separated from a lamp member and connected with a new one.

An especially elegant and compact arrangement is achieved, in that the lamp is designed as a helix or double helix, which encompasses the tubular shaped housing.

As a removable connection of the components, a simple, multi-polar plug-in connection is provided. In special cases a combined bayonet connection is preferred, which in addition to providing an electrical connection, also provides a secure mechanical connection.

The advantageous results of the invention are not limited to the concepts of the individual claims, but of all of the claims taken together.

A BRIEF DESCRIPTION OF THE DIFFERENT FIGURES OF THE DRAWINGS

FIG. 1 is a schematic side view of the compact fluorescent lamp made according to the invention, and representing a first form thereof.

FIG. 2 is a view looking down at the connecting side or position of the lamp.

FIG. 3 is a view similar to FIG. 1 of another form of the device, including a double helix.

FIG. 4 is a view oriented according to FIG. 2 but of the device shown in FIG. 3.

FIG. 5 is a schematic view of a side of a fluorescent lamp ballast, containing a plug member.

FIG. 6 is a view oriented according to FIG. 5 showing a connector plate on which the lamp is mounted.

FIG. 7 is a top view of the connector plate of FIG. 6.

FIG. 8 is a view oriented according to FIG. 7 and constitutes a top view of another connector plate.

FIG. 9 is oriented according to FIGS. 7 and 8, and showing still another form of the connector plate.

Figure 10:
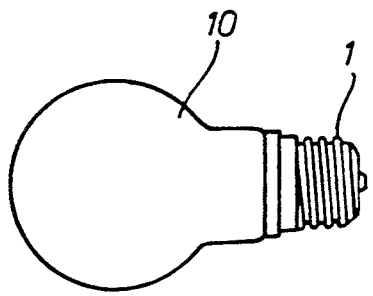

FIG. 10 includes an incandescent bulb for purposes of comparison of size of lamps of the present invention.

Figure 11:
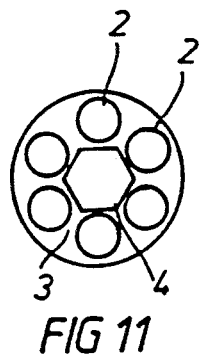
Figure 12:
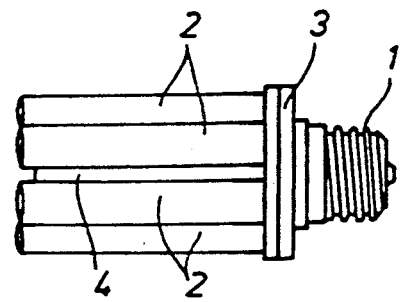

FIG. 11 is a front view of a compact fluorescent lamp according to FIG. 12.

FIG. 12 is a side view of the lamp according to FIG. 11.

Figure 13:

FIG. 13 is a view of the connecting side of a fluorescent lamp ballast.

Figure 14:
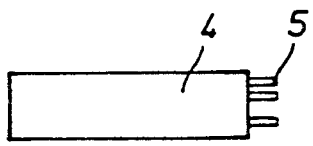

FIG. 14 is a side view of the ballast according to FIG. 13.

Figure 15:
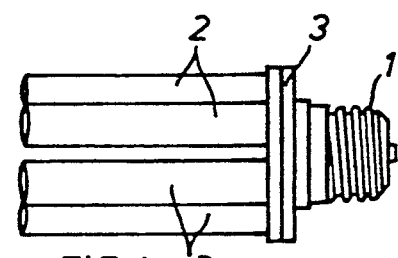

FIG. 15 is a side view of a compact fluorescent lamp.

Figure 16:
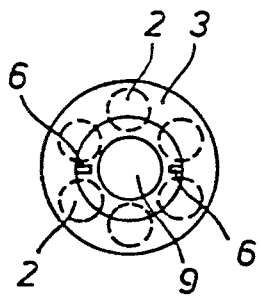
Figure 17:
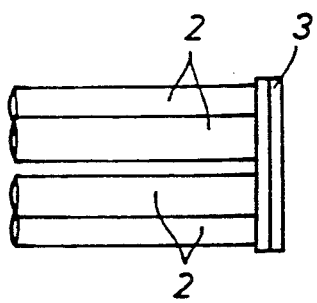

FIG. 16 is a front view of a compact fluorescent lamp according to FIG. 17.

FIG. 17 is a side view of the fluorescent lamp of FIG. 16.

Figure 18:
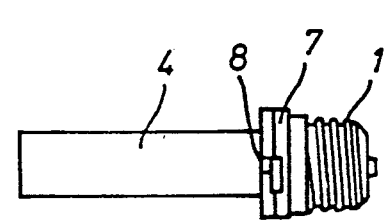

FIG. 18 shows the removable connection of a fluorescent lamp ballast with a connecting part.

Figure 19:
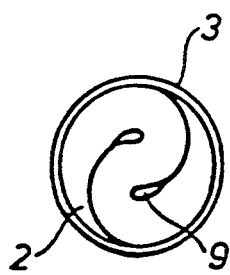

FIG. 19 is a front view of an additional form of the fluorescent lamp, this form including a double helix.

Figure 20:
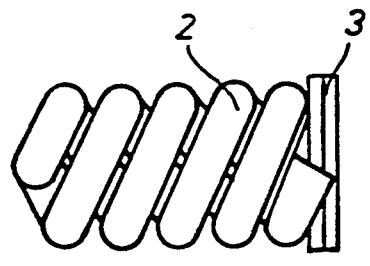

FIG. 20 is a side view of the fluorescent lamp according to FIG. 19.

Figure 21:
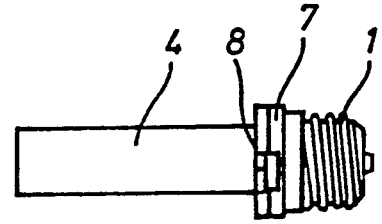

FIG. 21 is a side view of the fluorescent lamp ballast removably connected with the connecting part for the fluorescent lamp according to FIG. 20.

FIGS. 22-24 show an additional form of the fluorescent lamp.

FIGS. 25-27 show still a further form of fluorescent lamp.

DETAILED DESCRIPTION OF CERTAIN PREFERRED FORM OF INVENTION

FIG. 1 shows one form of a compact fluorescent lamp, illustrating the extremely simple design and construction according to the invention. In this construction, eight tubular lamps 2, forming a lamp unit 27, are positioned in a coupling ring 29, and sufficient space is provided to position the tubular shaped housing 4, which accommodates components of the ballast 28.

Within the coupling ring 29, four rigid plug-in connections 30 are positioned next to each other, and upon insertion of the ballast 28, the connections 30 come in contact with the elastic plug-in connections 32.

The elastic plug-in connections 32 are, for example, soldered in a circuit plate 36 and thereby form a direct connection with the other components of the ballast 28.

The rigid plug-in connections 30 contain slits 35 forming a clamping connection, in order to be able to automatically clamp the connecting leads 31 of the tubular lamps. The automatic clamping of the connecting leads 31 is thereby simplified according to the invention in that the rigid plug-in connections 30 are provided approximately at the height of the connecting leads.

The fluorescent lamp ballast 28 includes the usual connecting part 1 in the form of an Edison plug E 27. In the construction of this form, a cone-shaped plastic hood or hang-on 38 is included, which provides for housing the electronic components.

The tubular housing 4 in the space in the tubular lamps 2 forms sufficient space so that one can provide a space-saving construction of a quadratic cross-section and eliminate the contours 39 indicated in dashed lines on the conical member 38.

In view of the advantage now provided by the invention, the ballast 28 and the lamp unit 27 will preferably be separated and shipped separately, the construction of the ballast 28 is a cost-and storage-saving solution.

FIG. 3 is a view of another variant of construction according to the invention, with a double-coiled tubular lamp 2, shown in profile. In this case also, the ends 40 of the tubular lamp 2 are fastened in the holes 34 of the coupling ring 29.

Since the ends 40 of the tubular lamp 2 lie diametrically opposite each other, it is desired to arrange the rigid plug-in connections 30 at both sides of the ballast 28. The elastic plug-in connections 32 engage the rigid plug-in connections 30 through axial slits 33. Also, in this arrangement, the elastic plug-in connections 32 are soldered in a circuit plate 36.

A great advantage of this compact lamp with a double-coiled tubular lamp tube consists in the feature that in the coupling ring 29 only two ends 40 are present and consequently in the plane of the coupling ring 29 essentially more space can be used for the components of the ballast 28.

In the present construction, it will be realized that an advantage is provided in the flat construction of the contours 39 of the ballast 28. For convenience, similar parts in FIGS. 1 and 3 are indicated with the same reference numerals.

The construction of the compact fluorescent lamp as represented in FIGS. 1 and 3, shows the extreme simplicity of the device, and its suitability for fully automatic assembly representing a revolutionary improvement over previous solutions.

It will be understood that the specific representations included herein are not limiting, but serve as illustrations of the broad concept of the invention, and that changes may be made for example in the connection of the connecting leads 31, and design of synthetic parts. Additionally, the use of other connecting parts instead of the E 27 plug may be utilized.

FIGS. 5-7 show a further construction utilizing removable connection of the ballast 28, which is housed in the plastic hood 38. At the front side, positioned before the fluorescent lamp in axial direction. This plug can be plugged into a socket 42 shown in FIG. 6. The socket in this case is built into the coupling ring 29.

The socket 42 includes different receptacles 49, 50 assuring a correct positioning of the plug 41 in the socket.

The tubular lamp members 2 are connected with the elastic plug-in connections 33 by means of terminal lugs 45, 46. The elastic plug-in connections 32 extend into the receptacles 49, 50 of the socket 42, whereby upon the insertion of the plug 41, the plug-in connection 32 comes into contact with the contacts 47 of the plug 41.

FIGS. 8 and 9 show comparable constructions; the plug 43 (FIG. 9) can be formed in a triangular shape instead, as shown, or with quadratic receptacles 49, 50, (FIG. 8) providing proper positioning of the ballast 28 in the plug 42-44.

FIGS. 10-12 show, for comparison in size, a conventional 100-watt incandescent bulb 10 and a compact fluorescent lamp made according to the invention, including standard tubular lamp members available on the market. It will be seen that the diameter of the fluorescent lamp, despite six concentric tubular lamp members 2, is smaller than the 100-watt incandescent bulb. Conventional fluorescent lamps available on the market with built-in electronic ballasts are essentially larger in diameter.

FIG. 11 schematically shows the arrangement of the tubular shaped housing 4 which contains at least the essential, expensive components of the electronic ballast. To provide desired reflection characteristics, the housing 4 may be shaped round, multi-sided, or of other shape.

FIG. 12 shows a construction of a lamp according to the invention. The connecting part 1, in this case a conventional Edison 27 screw-threaded insert plug, is directly connected with a ground plate 3, which carries six tubular lamp members 2. Normally, such a lamp would have a singular tubular lamp member separated in six short meandering parts. Lined centrally within the tubular lamp members 2 is the electronic ballast in the tubular shaped housing 4.

FIGS. 13–15 show a similarly constructed lamp, but with an attachable housing 4 which can be attached to a ground plate 3 with the plug pins 5.

FIGS. 16–18 show another form of construction according to the invention. In this case the housing 4 is mounted securely on a base 7, which is also securely fastened with the connector piece 1.

The tubular lamp members 2 are fastened to the ground plate 3 in a secure unit, which can be merely inserted into the base 7 by means of two contact pins 6 and upon turning in the groove 8, it is mechanically secured.

The tubular shaped housing 4 is inserted through the hole 9 of the ground plate 3.

By means of connecting the tubular shaped housing 4 with the base 7 and the connecting part 1, parts of the electronic ballast can also be housed in the base 7 and the connector part 1. Thereby the length of the tubular shaped housing 4 can be minimal.

In exchanging damaged tubular lamp members, a minimum cost is involved with the construction shown in FIG. 17.

The various forms of construction shown and described are to be understood as being examples, and not as limitations in dimensions or manner of shaping. Such a condition is represented in FIGS. 19–21. In this case the tubular lamp member 2 is designed as a double helix, so that when it is installed in position, it concentrically encompasses the tubular shaped housing 4.

This construction made according to the invention is distinguished both in that it can be simply produced, and in having a direct light radiation in axial direction. Additionally, in the same space a larger length of tubular lamp can be accomodated.

The invention enables extensive freedom in shaping of the elements.

Two, four, six or more tubular lamp members, or parts thereof can be arranged parallel, or slanted, as desired. The connecting parts can be provided with coil or bayonet locks, or with simple plug-in connections, as a result of which it can be inexpensively mass produced.

FIGS. 22–24 show a simple construction with four parallel-lying tubular lamp members. FIG. 23 shows the related tubular shaped housing 4 with the connector part 1. In these parts the ballast is housed in a space-saving fashion. The bayonet connection 8 in the base 7 receives the connecting pins 6 of the round plate 3 and not only secures the parts mechanically, but provides a good electrical connection therebetween.

The connector part 1 is provided, in this case (FIG. 24), with terminal screws 18 inside the housing 21, enabling the direct connection with the electric circuit, and it may be arranged over a switch of a light fixture.

The housing 21 also has a screw thread 20, which is customary with lamp sockets for installation in light fixtures. Thereby the ballast according to the invention becomes a secure component of the lighting fixture, and a special mounting becomes unnecessary.

FIGS. 25–27 show an especially flat modification, in this case also similar parts being indicated with the same reference numerals.

FIG. 27 shows an exemplary construction, including the tubular shaped housing 4 with the bayonet connection 8, and a fastening plate 22 with screw holes 23, which serve for direct mounting on a ceiling or a wall of a room, or on a lighting fixture.

A screw thread 24 enables the threading-on of a cap 26 with an interior thread 25, which after clamping the electric power leads at the clamps 18, protect the clamps 18 from disturbance.

In a known manner, other holders or lamp shades can be fastened on the threads 24.

By means of the construction of FIG. 24, a compact fluorescent lamp according to the invention becomes an inexpensive lighting fixture. It is of course to be understood that the construction is an example and can be modified in different ways.

I claim:

1. A compact fluorescent lamp having a longitudinal axis, comprising,
   a coupling ring,
   a plurality of rigid plug-in connections in the coupling ring and distributed around a central space,
   the coupling ring having holes on a circle larger than the concentric with the central space,
   a plurality of tubular lamps forming a lamp unit, each having an end extended into the coupling ring and mounted in and extending through said holes respectively, and detachably connected to the rigid plug-in connections respectively,
   a ballast having a plate and a tubular housing and electric plug-in connections,
   the ballast being fitted to the coupling ring, with the tubular housing extended into the central space, and the elastic plug-in connections in releasable contact engagement with the rigid plug-in connections, and
   the rigid plug-in connections in the coupling ring and the flexible plug-in connections lying substantially in a common plate transverse to said longitudinal axis.

2. A compact fluorescent lamp according to claim 1 wherein,
   the elastic plug-in connections are, adjacent the electronic ballast, arranged in slits parallel to the axis whereby they are protected against disturbance.

3. A compact fluorescent lamp according to claim 2 wherein,
   the rigid plug-in connections are provided with clamping devices, including slits for clamping the connection leads of the tubular lamps.

4. A compact fluorescent lamp according to claim 3 wherein,
   said plate of the ballast is a circuit plate, and
   the elastic plug-in connection are directly soldered to said circuit plate.

5. A compact fluorescent lamp according to claim 4 wherein,
   the electronic ballast includes an Edison E27 type plug, and
   the ballast as a whole is substantially the width of that plug.

6. A compact fluorescent lamp comprising,
   a coupling ring,
   a plurality of rigid plug-in connections in the coupling ring and distributed around a central space, a plurality of tubular lamps forming a lamp unit each having an end extended into the coupling ring and detachably connected to the rigid plug in connection respectively, the tubular lamps including at least one, in the form of a helix, surrounding said central space, a ballast having a plate and a tubular housing and elastic plug-in connections and the ballast being fitted to the coupling ring, with the tubular housing extended into the central space, and the elastic plug-in connections in releasable contact engagement with the rigid plug-in connections.

7. A compact fluorescent lamp according to claim 6, wherein, the tubular lamp is in the form of a double helix.

* * * * *